United States Patent
Tandon et al.

(10) Patent No.: US 8,805,294 B2
(45) Date of Patent: Aug. 12, 2014

(54) SYSTEM AND METHOD FOR FEEDING BACK INFORMATION TO A USER-TERMINAL FROM MULTIPLE HUBS

(75) Inventors: Tarun K. Tandon, San Diego, CA (US); Insung Kang, San Diego, CA (US)

(73) Assignee: Via Telecom Co., Ltd., Grand Cayman, KY (US)

( * ) Notice: Subject to any disclaimer, the term of this patent is extended or adjusted under 35 U.S.C. 154(b) by 984 days.

(21) Appl. No.: 11/586,986

(22) Filed: Oct. 25, 2006

(65) Prior Publication Data

US 2007/0111668 A1     May 17, 2007

Related U.S. Application Data

(60) Provisional application No. 60/736,474, filed on Nov. 12, 2005.

(51) Int. Cl.
*H04B 1/00* (2006.01)

(52) U.S. Cl.
USPC ............ 455/69; 455/67.11; 455/33.2; 379/60

(58) Field of Classification Search
USPC ............................ 455/69, 67.11, 33.2; 379/60
See application file for complete search history.

(56) References Cited

U.S. PATENT DOCUMENTS

| 6,021,125 A | 2/2000 | Sakoda et al. |
| 6,178,329 B1 | 1/2001 | Chao et al. ................. 455/452 |
| 2003/0031119 A1 | 2/2003 | Kim et al. .................. 370/200 |

FOREIGN PATENT DOCUMENTS

| EP | 0 479 255 A2 | 8/1992 |
| EP | 1 206 147 A2 | 5/2002 |
| WO | WO 99/41925 | 8/1999 |

OTHER PUBLICATIONS

EP Search Report from Appln No. 06023444.0-2412.

*Primary Examiner* — Hsin-Chun Liao

(74) *Attorney, Agent, or Firm* — K&L Gates LLP

(57) ABSTRACT

This invention discloses a method in a wireless communication network, the method comprises generating a first piece of feedback information by a first hub serving a user terminal, transmitting a second piece of feedback information to the first hub by a second hub, combining the first and second pieces of feedback information by the first hub to form a third piece of feedback information, and transmitting the third piece of feedback information to the user terminal.

13 Claims, 3 Drawing Sheets

SYSTEM AND METHOD FOR FEEDING BACK INFORMATION TO A USER-TERMINAL FROM MULTIPLE HUBS

CROSS REFERENCE

The present application claims the benefit of U.S. Provisional Application Ser. No. 60/736,474, which was filed on Nov. 12, 2005.

BACKGROUND

The present invention relates generally to mobile communication networks, and, more particularly, to feedback information to user-terminals.

Present day communication networks with a grid of hubs (base-stations) serving multiple user-terminals (mobile stations or any other access-terminals), e.g. cellular networks, are often required to provide some measure of reception quality at the serving hub back to a user accessing the network. This feedback is typically used by the user terminal for periodically updating its transmission parameters in such a way that the overall communication network performance may be optimized. A particular selection of the transmission parameters at a user-terminal can also affect the link performances with the nearby hubs within the reception range of user's transmissions, in addition to the performance of the link with its serving hub. In the interest of overall optimization of the network performance, the selection of transmission parameters at the user terminal at any given time should be based on not only the reception quality at the serving hub, but also on the effects of its transmissions with the neighboring hubs within the reception range.

In a traditional communication network, all of the hubs within the reception range of the transmissions from a user-terminal are required to provide an estimation of the reception quality as perceived by them individually, directly to the user-terminal. This means that the user-terminal receives a feedback on the reception quality of its transmissions not only from the hub it is being served, but also from many other hubs in its vicinity. This requires the user-terminal to possess the ability to receive and process those multiple streams of the feedback information, in addition to the ability to receive and process the data and feedback received from the serving hub it is connected to. This capability is usually provided in the user-terminal by implementing more processing elements for the feedback from multiple hubs than needed to maintain the connection with the serving hub.

Implementation of extra elements requires additional hardware and software resources in the user-terminal. Besides, the receiver design of the user terminal will be more complicated because of the number of processing elements for the feedback information may vary as networks and locations may be different.

For instance, in High Rate Packet Data (HRPD) networks, which have a synchronous forward link and an asynchronous reverse link, the reverse-link power control is often influenced by multiple sectors or base-stations. In a typical scenario, a single base-station (or sector) serves the forward link to minimize the interference, while multiple base-stations (or sectors) serve the reverse link to gain from diversity. In such a system, the user-terminal receives the power-control bits from multiple base-stations (or sectors), while receiving the forward link data from a single base-station (or sector). This imposes an additional requirement in the user-terminal receiver design to handle the data and the power control bits separately, especially with a different number of processing elements.

As such, what is desired is a system and method to reduce the number of data streams received by a user terminal.

SUMMARY

This invention discloses a method and system in a wireless communication network. According to a first aspect of the invention, a method comprises generating a first piece of feedback information by a first hub serving a user terminal, transmitting a second piece of feedback information to the first hub by a second hub, combining the first and second pieces of feedback information by the first hub to form a third piece of feedback information, and transmitting the third piece of feedback information to the user terminal.

According to a second aspect of the invention, a wireless communication network comprises a first hub serving a user terminal and is configured to generate a piece of first feedback information corresponding to the user terminal, and a second hub within the reception range of the user terminal configured to transmit a second piece of feedback information also corresponding to the user terminal to the first hub, wherein the first hub is configured to combine the first and second pieces of feedback information to form a third piece of feedback information and to transmit the third piece of feedback information to the user terminal.

The construction and method of operation of the invention, however, together with additional objectives and advantages thereof will be best understood from the following description of specific embodiments when read in connection with the accompanying drawings.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore non-limiting, embodiments illustrated in the drawings, wherein like reference numbers (if they occur in more than one view) designate the same elements. The invention may be better understood by reference to one or more of these drawings in combination with the description presented herein. It should be noted that the features illustrated in the drawings are not necessarily drawn to scale.

DESCRIPTION

The present invention may be implemented to provide a mechanism for multiple hubs to feedback information to a user terminal in a communication network.

Figure 1:
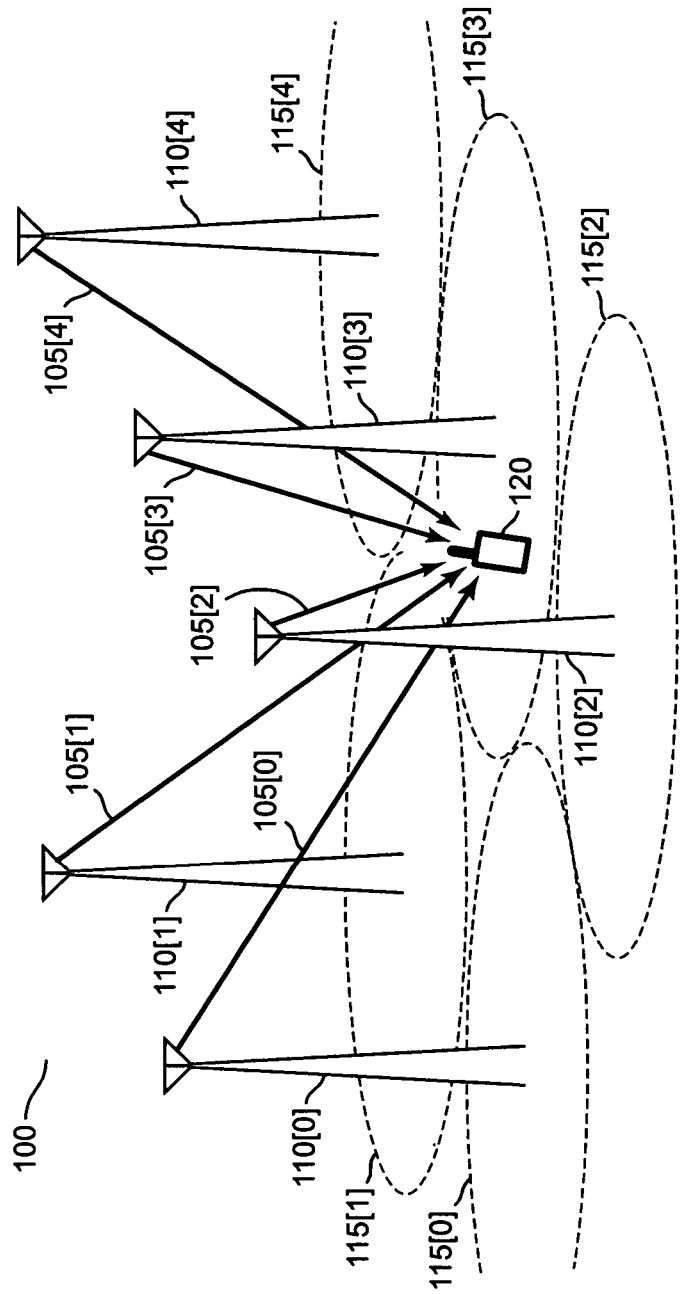
FIG. 1 shows a conventional wireless communication network having multiple hubs with separate information feedback.

FIG. 1 shows a conventional wireless communication network 100 with separate information feedback 105[0:4] from multiple hubs 110[0:4]. FIG. 1 shows five exemplary hubs 110[0:4], that offer communication services to cells 115[0:4], respectively. A user terminal 120 is placed in the cell 115[3], so that the hub 110[3] serves the user terminal 120, while the hubs 110[0:2] and 110[4] are within the reception range of the user terminal 120. Each hub 110[x], where x=0:4, feeds back its reception quality information 105[x] to the user terminal 120, individually. Such multiple streams of feedback information 105[0:4] require the user terminal 120 to have more processing elements to process them, therefore increases the number of hardware and software, as well as complicate the design of the user terminal 120.

Figure 2:
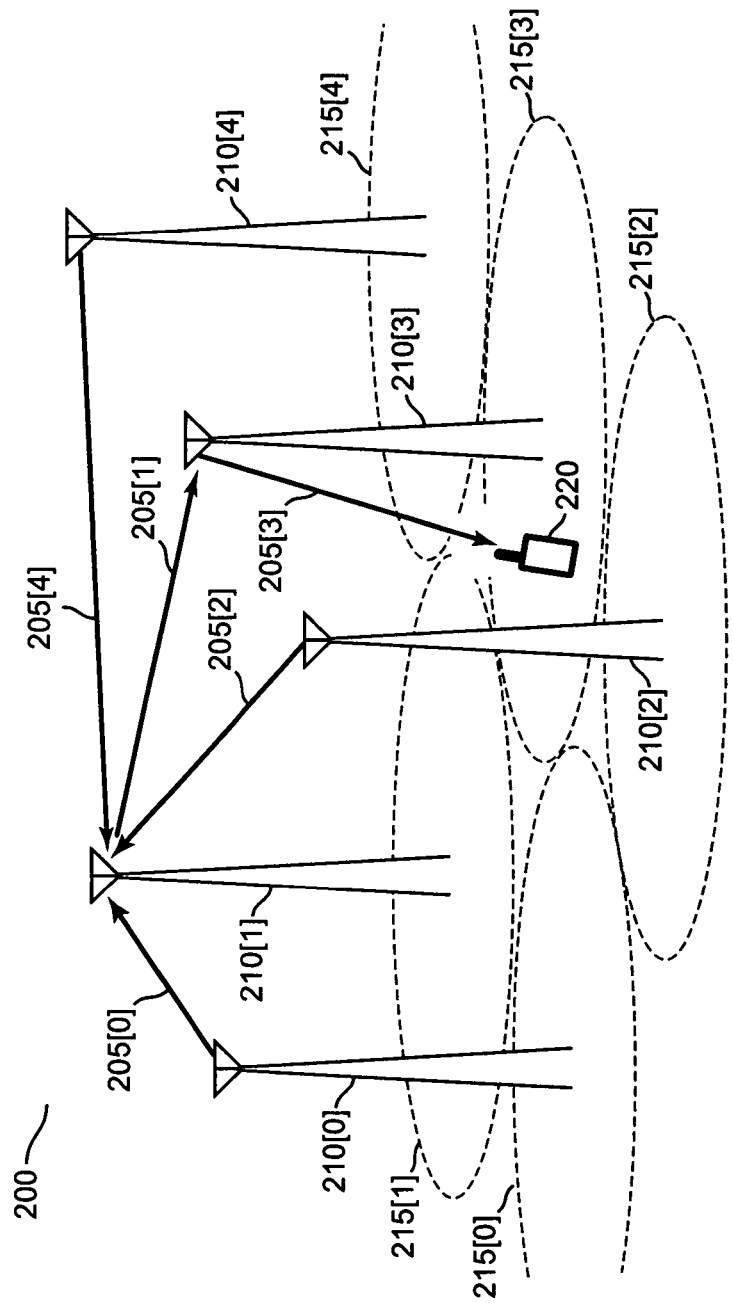
FIG. 2 shows a wireless communication network having multiple hubs with collective information feedback according to one embodiment of the present invention.

FIG. 2 shows a wireless communication network 200 having multiple hubs with a collective information feedback. FIG. 2 shows five exemplary hubs 210[0:4], that offer communication services to cells 215[0:4], respectively. A user terminal 220 is placed in the cell 215[3], so that the hub 210[3] serves the user terminal 220, while the hubs 210[0:2] and 210[4] are within the reception range of the user terminal 120. Instead of feeding back reception quality information to the user terminal 220 individually by each hub, the network 200 designate a hub 210[1] as a center hub, and have all other none serving hubs yet within the reception range, 210[0], 210[2] and 210[4], to send their reception quality information, 205[0], 205[2] and 205[4], respectively, to the center hub 210[1]. The center hub 210[1] then collects all the feedback information and sends a combined reception quality feedback stream 205[1] to the serving hub[3]. The serving hub 210[3] merges this combined reception quality information 205[1] with its own reception quality feedback information to form a single feedback stream 205[3], and then sends it to the user terminal 220, it is serving. The aforementioned center hub may simply be the serving hub, or a dedicated hub exclusively for feeding the user terminal with feedback information.

The principle advantages of this invention include efficient resource utilization by eliminating the need for multiple hubs to transmit the reception quality feedback directly to the user-terminal. By receiving a single feedback stream, the user terminal has no need for extra reception and processing elements. Thus, the implementation of diversity combining (if any) in the user-terminal is simplified due to the fact that the number of processing elements is fixed for the data and the feedback streams.

Although this embodiment describes only feeding back reception quality information, one having skill in the art would also appreciate that the present disclosure applies to different information feedbacks. As an example, the present invention may be applied in a High Rate Packet Data (HRPD) network, which has a synchronous forward link and an asynchronous reverse link. According to one embodiment of the present invention, all of the base-stations of the HRPD network receives the reverse link from a user terminal, and sends their respective power-control bit decisions to a central location which can be either the serving base-station or the base-station controller (BSC). The central location then combines the power-control bit decisions, and sends the combined power-control bits decision to the serving base-station if the central location is the base-station controller. The serving base-station sends the overall combined power-control bit decision on the forward link along with the forward link data. Thus, the user terminal can process the forward-link data and the power-control bits with the same number of processing elements in its receiver.

Figure 3:
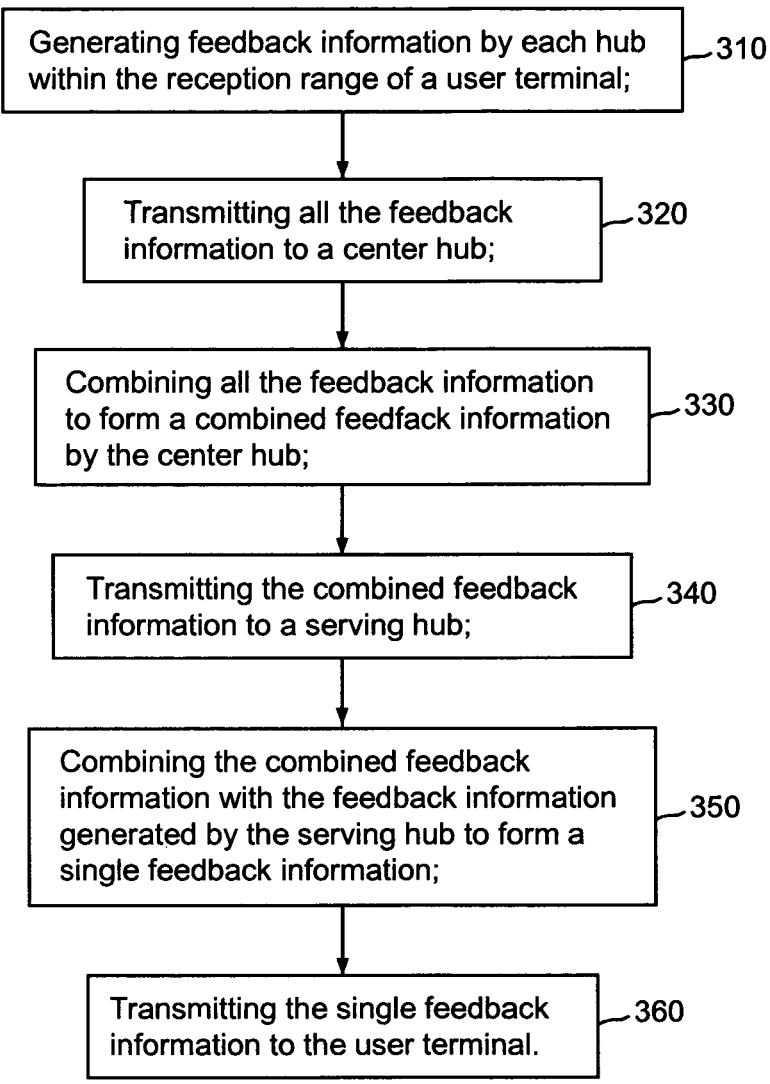
FIG. 3 is a flow chart illustrating steps of collectively feeding back information to a user terminal according to the embodiment of the present invention.

FIG. 3 is a flow chart illustrating steps of collectively feeding back information to a user terminal according to the embodiment of the present invention. A user terminal is placed in a wireless communication network with a grid of hubs. A particular hub serving the user terminal will generate feedback information, and all other hubs within the reception range of the user terminal also generate feedback information. The feedback information may be reception quality information. According to the embodiment of the present invention, step 310 is to generate feedback information by each hub within the reception range of the user terminal. Step 320 is to transmit all the feedback information to a center hub. Step 330 is to combine all the feedback information to form a piece of combined feedback information by the center hub. Step 340 is to transmit the combined feedback information to the serving hub. Step 350 is to combine the combined feedback information with the feedback information generated by the serving hub to form a single stream of feedback information. Step 360 is to transmit the single feedback information to the user terminal, wherein the user terminal receives only one feedback data stream and hence does not need to have extra processing elements.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A method in a wireless communication network having multiple hubs and a user terminal, the method comprising:
designating one of multiple non-serving hubs or a serving hub as a center hub, wherein each hub within the reception range of the user terminal generates a first feedback information including reception quality information, wherein the center hub is a dedicated hub exclusively for feeding feedback information to the user terminal;
transmitting the first feedback information corresponding to the user terminal to the center hub by all non-serving hubs within the reception range of the user terminal;
combining all the first feedback information to a first combined feedback information by the center hub;
transmitting the first combined feedback information to the serving hub by the center hub;
combining the first combined feedback information with a second feedback information generated by the serving hub to form a second combined feedback information; and
transmitting the second combined feedback information to the user terminal by the serving hub, wherein the first feedback information from the non-serving hubs is transmitted only to the center hub to reduce reception and processing elements at the multiple hubs and the user terminal.

2. The method of claim 1, wherein the first and second feedback information comprise reception quality information.

3. The method of claim 1, wherein the center hub is the serving hub.

4. The method of claim 1, wherein the center hub, the serving hub, and the non-serving hubs are members of a grid of hubs within the reception range of the user terminal.

5. The method of claim 1, wherein the second combined feedback information is a single feedback information transmitting from the serving hub to the user terminal.

6. A wireless communication network having multiple hubs, the network comprising:

a serving hub;

a center hub designated by the network, the center hub being one of multiple non-serving hubs or the serving hub, wherein the center hub receives a first feedback information corresponding to a user terminal generated by non-serving hubs within the reception range of the user terminal and combines all the first feedback information to a first combined feedback information, the center hub being a dedicated hub exclusively for feeding feedback information to the user terminal, wherein the center hub transmits the first combined feedback information to the serving hub, the serving hub combines a second feedback information generated by the serving hub with the first combined feedback information to form a second combined feedback information, and wherein the serving hub transmits the second combined feedback information to the user terminal which receives no feedback information from the non-serving hubs such that the number of data streams sent to the user terminal is reduced, and wherein the first feedback information from the non-serving hubs is transmitted only to the center hub to reduce reception and processing elements at the multiple hubs.

7. The network of claim 6, wherein the first and second feedback information comprise reception quality information.

8. The network of claim 6, wherein the center hub and the serving hub are the same hub.

9. The network of claim 6, wherein the first feedback information is generated by the non-serving hubs, respectively.

10. The network of claim 6, wherein the serving hub, the non-serving hubs and the center hub are members of a grid of hubs.

11. The network of claim 6, wherein the second combined feedback information is a single feedback information transmitting from the serving hub to the user terminal.

12. The network of claim 6, wherein the serving hub is communicating with the user terminal before transmitting the first combined feedback information to the serving hub.

13. A method for reducing data stream received by a user terminal in a wireless communication network having multiple hubs, the method comprising:

designating one of a plurality of non-serving hubs within the reception range of the user terminal as a center hub, wherein each of the plurality of non-serving hubs generates feedback information corresponding to the user terminal and transmits the feedback information to the center hub, and the center hub is a dedicated huh exclusively for feeding, feedback information to the user terminal;

combining all the feedback information to form a first combined feedback information by the center hub;

transmitting the first combined feedback information to a serving hub by the center hub;

combining the first combined feedback information with a feedback information generated by the serving hub to form a second combined feedback information; and transmitting the second combined feedback information to the user terminal by the serving hub, wherein the user terminal receives no feedback information from the non-serving hubs such that the number of data streams sent to the user terminal is reduced, wherein the feedback information from the non-serving hubs is transmitted only to the center hub to reduce reception and processing elements at the multiple hubs.

* * * * *